J. R. KINNEY.
ROAD OILER.
APPLICATION FILED APR. 6, 1914.

1,139,423.

Patented May 11, 1915.
5 SHEETS—SHEET 1.

Witnesses:
Roswell F. Hatch
N. C. Lombard

Inventor:
Justus R. Kinney,
by Walter E. Lombard,
Atty.

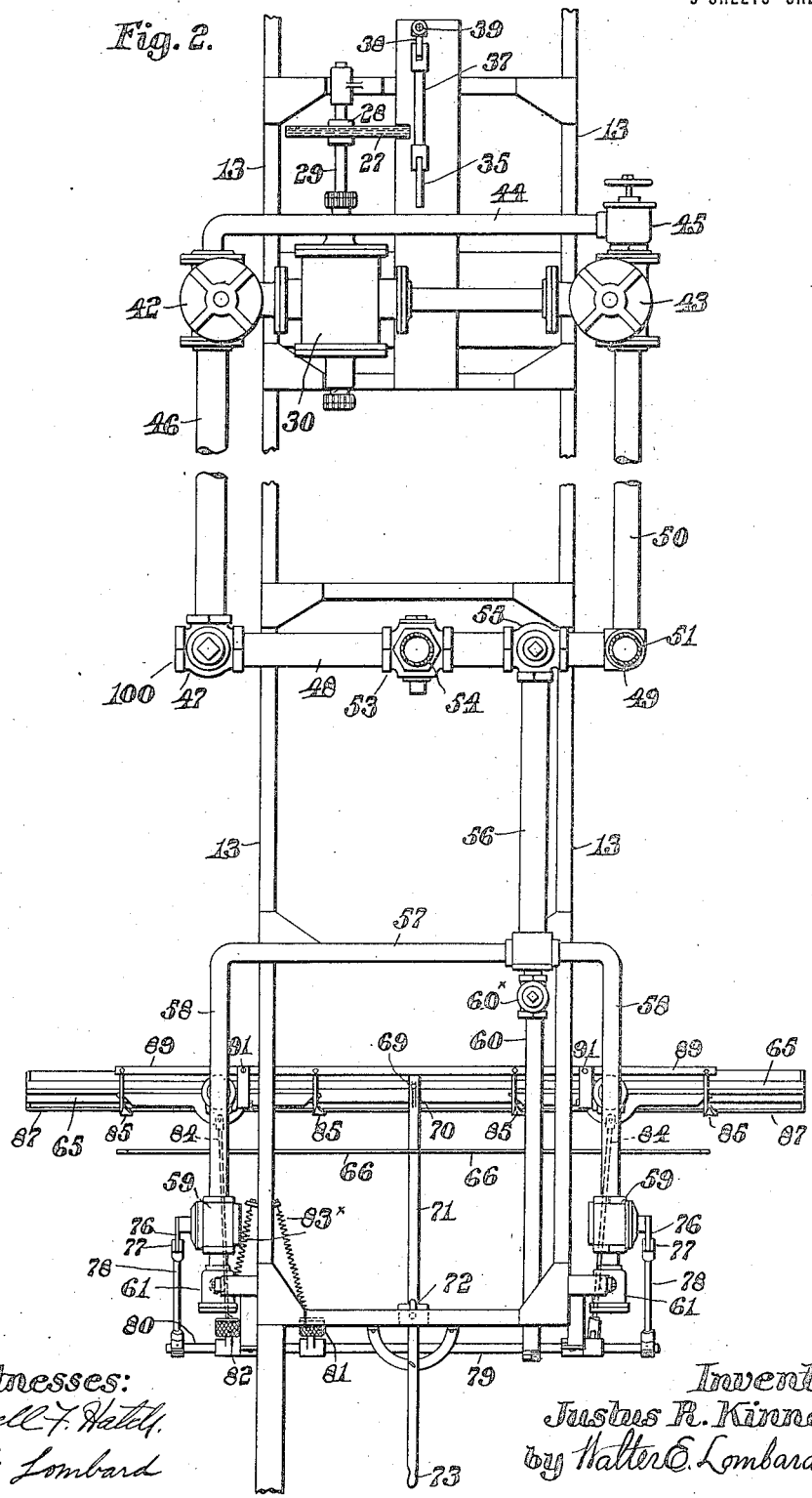

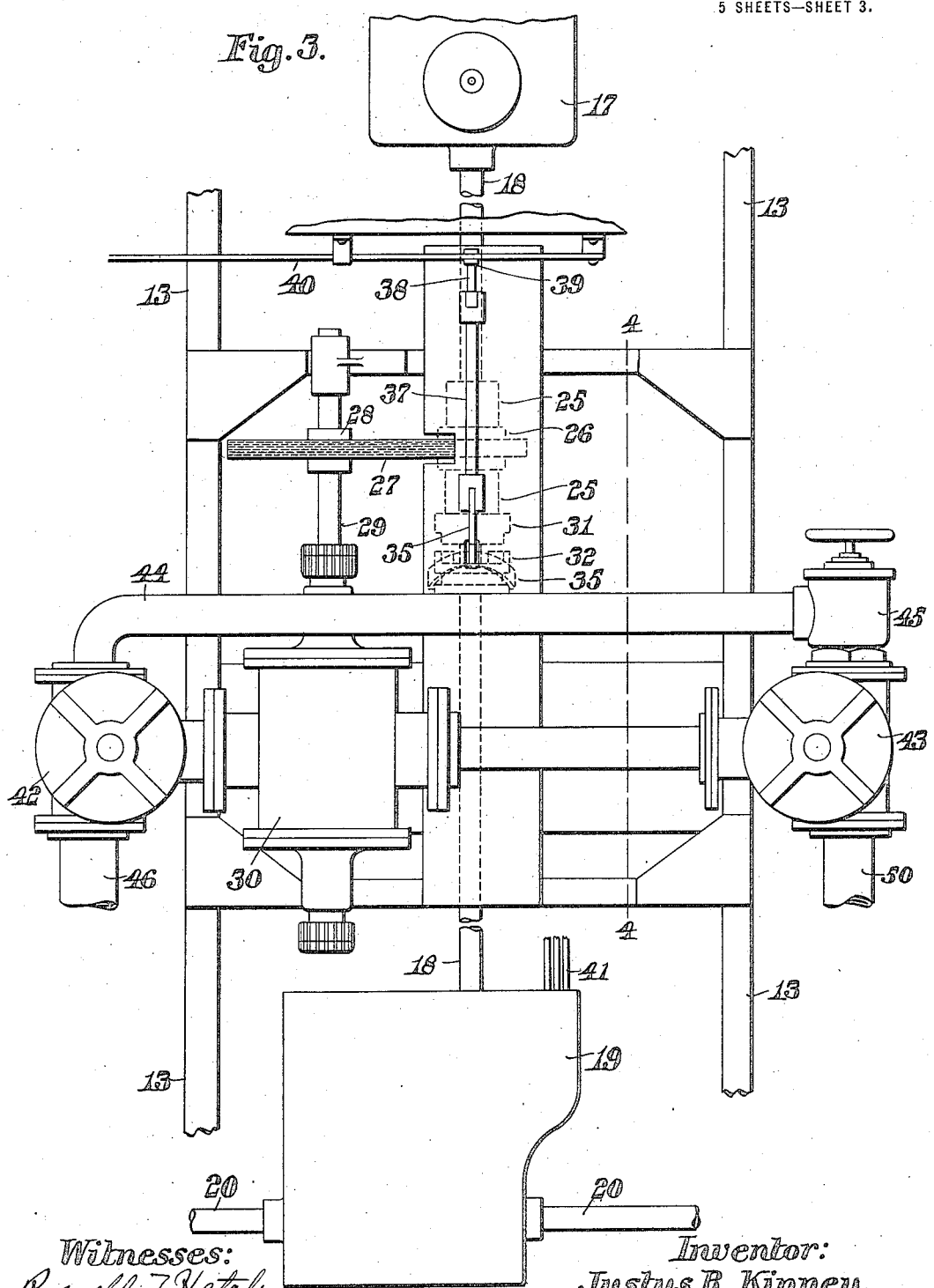

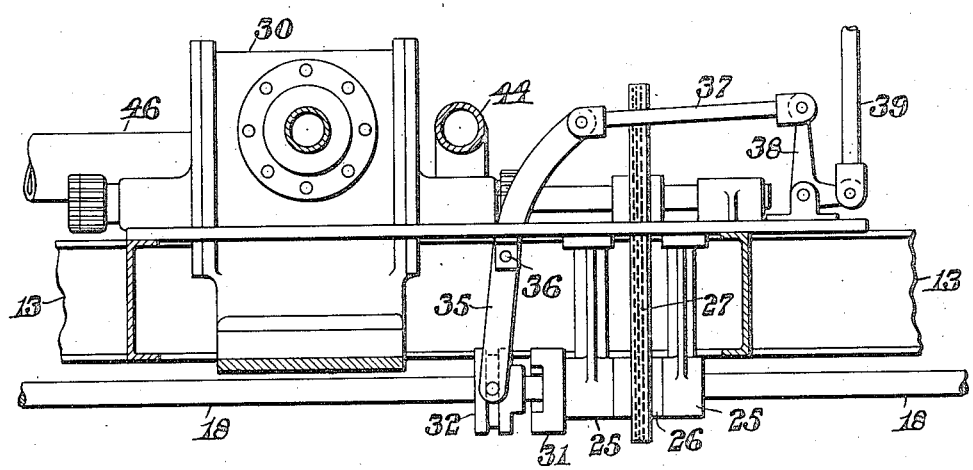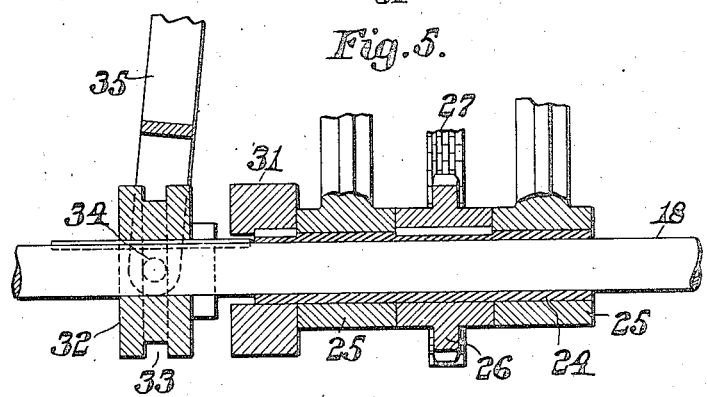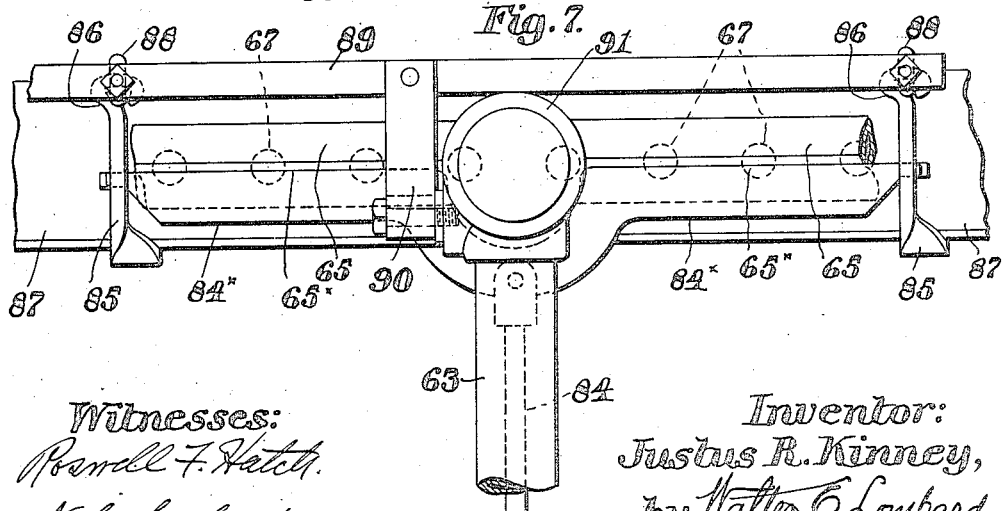

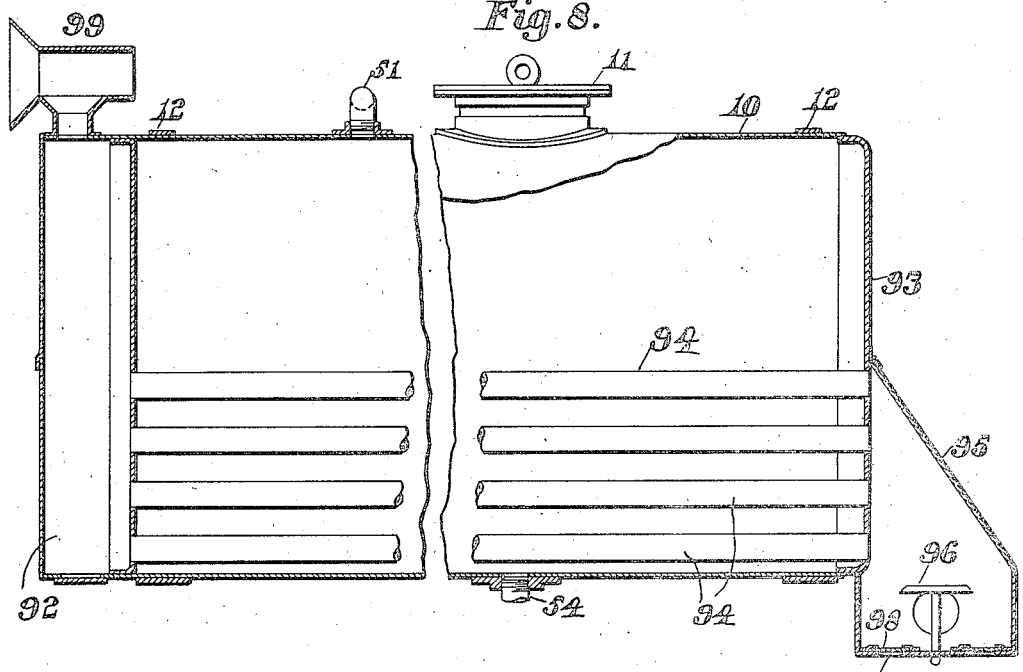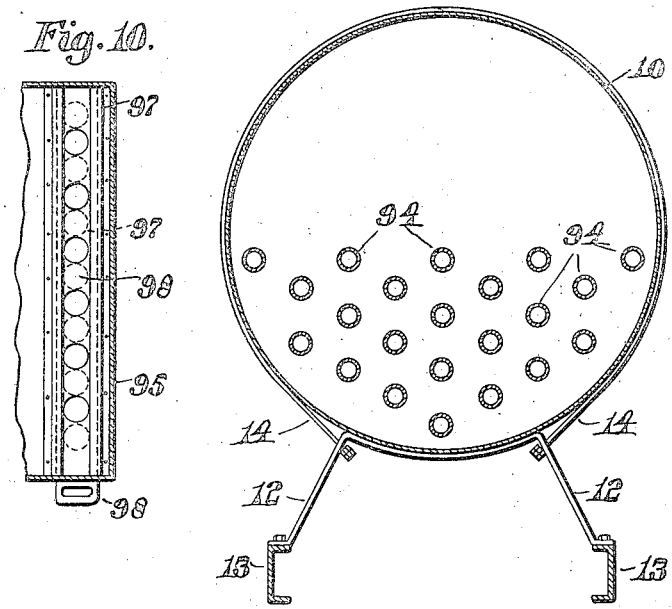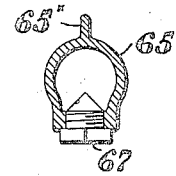

UNITED STATES PATENT OFFICE.

JUSTUS R. KINNEY, OF DORCHESTER, MASSACHUSETTS.

ROAD-OILER.

1,139,423.

Specification of Letters Patent.

Patented May 11, 1915.

Application filed April 6, 1914. Serial No. 830,076.

*To all whom it may concern:*

Be it known that I, JUSTUS R. KINNEY, a citizen of the United States of America, and a resident of Dorchester, in the county of Suffolk and State of Massachusetts, have invented certain new and useful Improvements in Road-Oilers, of which the following is a specification.

This invention relates to apparatus for applying liquids to roads, and has for its object the production of a device of this class by which oil may be applied to the road either in the form of a spray or in larger quantities, as may be desired, and which may be utilized also in watering the roads, or even used as a fire apparatus, means being provided whereby the tank may be filled with water and pumped therefrom for the latter purpose.

The invention consists in a self-propelled vehicle, the engine of which is adapted to drive a rotary pump either while said vehicle is moving or at a standstill, said pump being adapted for use in filling the tank or emptying it either through a discharge pipe or through spray nozzles.

The invention further consists in certain novel features of construction and arrangement of parts which will be fully understood by reference to the description of the drawings and to the claims hereinafter given.

Figure 1:
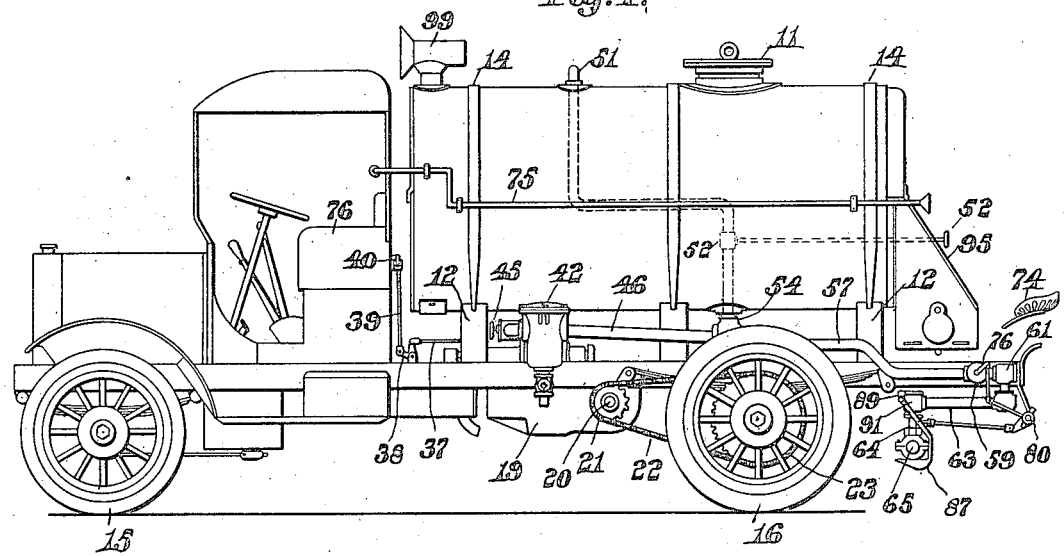
Figure 6:
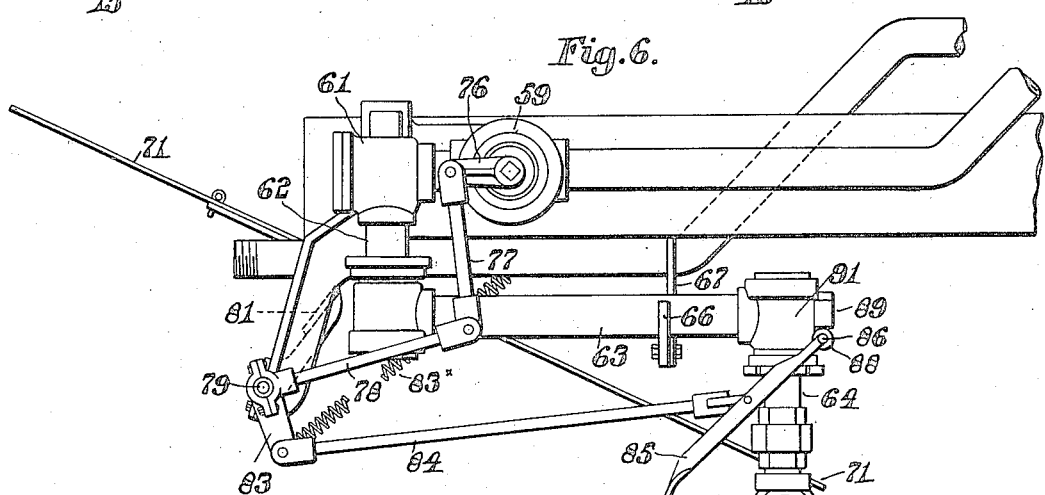
Figure 12:
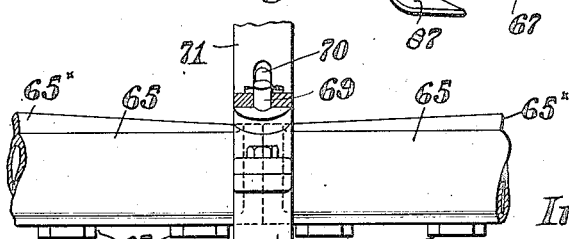

Of the drawings: Figure 1 represents an elevation of an apparatus embodying the features of the present invention. Fig. 2 represents a plan of the supporting framework thereof and showing the system of piping. Fig. 3 represents a similar view, drawn to an enlarged scale, of a portion of the same, and showing in diagram the engine and the transmission mechanism. Fig. 4 represents a longitudinal section of the same, the cutting plane being on line 4—4 on Fig. 3. Fig. 5 represents a longitudinal section of the clutch mechanism, said figure being drawn to an enlarged scale. Fig. 6 represents an elevation of the spraying device at the rear of the vehicle. Fig. 7 represents a plan of a portion of the sprinkler pipe and the pan for catching the drippings therefrom. Fig. 8 represents a longitudinal section through the tank. Fig. 9 represents a transverse section of the same. Fig. 10 represents a horizontal section through the heater. Fig. 11 represents a vertical section through the sprinkler pipe, and Fig. 12 represents an elevation of the abutting ends of the sprinkler pipes, and showing the means for clamping the ends together and for imparting end movement thereto.

Similar characters designate like parts throughout the several figures of the drawings.

In the drawings, 10 is a tank provided at the top with the filling dome 11 through which the tank may be filled from any suitable source of supply located above said tank. The tank 10 is supported on cradles 12 made of flat metal bars bent to form a seat for the tank with end braces extending therefrom which are secured to the frame 13. Straps 14 pass around the tank 10 and have threaded ends extending through said bars and adjusting and locking nuts on said threaded ends. The frame 13 is supported on wheels 15—16 and has an engine 17 mounted thereon by which the rear wheels 16 may be driven in any well-known manner through the medium of the driving shaft 18, the transmission mechanism 19, and the transversely disposed revoluble shafts 20. The ends of these shafts 20 have secured thereto sprocket wheels 21 engaging with endless chains 22 passing around sprocket wheels 23 secured to and revoluble with the driving wheels 16.

The mechanism for propelling the vehicle forms no part of the present invention, any form of driving mechanism being adapted to be used. The engine driving shaft 18 has loosely mounted thereon a sleeve 24 freely revoluble in spaced bearings 25—25 depending from the frame 13. Between these bearings 25 the sleeve 24 has keyed or otherwise secured thereto a sprocket wheel 26 from which rotary movement is imparted by means of an endless chain 27 to a sprocket wheel 28 on the revoluble shaft 29 of a rotary pump 30.

The sleeve 24 has keyed or otherwise secured to its rear end one part 31 of a clutch, the other coacting part 32 thereof being keyed to and slidable lengthwise of the driving shaft 18 as indicated in Fig. 5 of the drawings. The member 32 has an annular peripheral groove 33 therein into which project the stud 34 of a forked lever 35 pivoted at 36 and connected at its upper end by a link 37 to one arm of a bell crank lever 38, the other arm of which has secured thereto a link 39, the opposite end of which is articulated to the operating lever 40 located conveniently to the chauffeur so that he may throw the clutch members 31—32 into and from engagement at will. By means of this construction the pump 30 may be operated by the engine 17 when the vehicle is moving over the road or it may be thrown out of commission as desired. It is obvious, moreover, that when the vehicle is as rest and the engine 17 is in operation, while the transmission mechanism is thrown out of commission in the usual manner by means of the rods 41, the pump 30 may be placed in commission at will and be driven by said engine.

To the inlet side of the pump 30 is connected a suction strainer 42 of any well-known construction, and a discharge strainer 43 of any desired type is connected to the discharge outlet of said pump.

The strainers 42—43 are connected by a by-pass pipe 44 having a relief valve 45 therein. The strainer 42 is connected by a pipe 46 with a three-way cock 47, one branch of which is connected to a transverse pipe 48, the opposite end of which is connected with one branch of a three-branched coupling member 49, another branch of which is connected by a pipe 50 with the discharge strainer 43, while the third branch has a pipe 51 leading therefrom to the top of the tank 10, said pipe having a cutoff valve 52 therein.

In the pipe 48 is a three-way cock 53, one branch of which is connected to the bottom of the tank 10 by a pipe 54. The pipe 48 also has another three-way cock 55 therein, one branch of which is connected by means of a pipe 56 to a cross-pipe 57 from the ends of which extend two parallel pipes 58—58 each having a valve 59 therein. The pipe 57 also has leading therefrom a discharge pipe 60 having a cutoff valve 60× therein. The end of the pipe 60 is threaded to receive a hose through which the contents of the tank may be discharged. The extreme ends of the pipes 58 have threaded thereto the supported members 61, each provided with a downwardly extending branch 62 about which the horizontal pipe 63 is adapted to be oscillated through an arc of a circle.

To the front end of each pipe 63 is secured a depending pipe 64 to the lower end of which is secured the sprinkler pipe 65 having an upwardly extending rib 65×. The pipes 63 are supported in their oscillatory movement by the rail 66 secured to hangers 67 depending from the frame 13.

The sprinkler pipes 65 are provided with the usual spray nozzles 67 and their abutting ends are secured together by means of the clamp member 68 having a projecting stud 69 positioned in a slot 70 in a lever 71 pivoted at 72 and provided with a handle 73 by which the operator supported on the seat 74 may move the pipes 65 endwise so that no space in the middle of the road will be left unsprayed. The seat 74 is at the left side of the vehicle so that the operator may better see the road ahead and by means of the controlling handle 73 may shift the sprinkler pipes 65 at will.

Conveniently disposed relative to the seat 74 is a speaking tube 75 the opposite end of which is adjacent to the seat 76 on which sits the chauffeur. By means of this speaking tube 75 the operator on the seat 74 may control the movement of the vehicle by messages transmitted to the chauffeur.

Each valve 59 is provided with an operating arm 76 connected by a link 77 to an arm 78 secured to the oscillating shaft 79 or 80 to which oscillatory movement is imparted by means of the foot lever 81 or 82. Each of the shafts 79 or 80 has also secured thereto and movable therewith an arm 83 connected by a link 84 to a yoke 84× connecting two depending members 85 pivoted at 86 and provided at their lower ends with a pan 87 adapted to be moved into position beneath the nozzles 67 to catch the drippings therefrom when passing over a crossing. The front edges of the yokes 84× abut against the rear faces of the ribs 65× on the sprinkler pipes 65. The members 85 are pivoted at 86 by means of an eye in the end of each passing through an eye 88 secured to a bar 89 having a foot 90 secured to the union 91 of the pipe 63. Each of the levers 83 has a spring 83× connected thereto and to the frame 13, the purpose of these springs being to retain normally the drip pans 87 beneath the nozzles 67 until the foot levers 81 and 82 are depressed into the position shown in Fig. 6 to withdraw said pans into the position shown in said Fig. 6 and at the same time open the valves 59.

The tank 10 is provided at its front end with a chamber 92 from which extend to and through the rear head 93 thereof a plurality of heating pipes 94 through which hot air is adapted to pass from the heater casing 95 situated at the rear end of the tank 10. The heater casing 95 has mounted therein a heater 96 of some well-known construction and the casing 95 has a plurality of openings 97 in the bottom thereof adapted to be closed or opened by the perforated slides 98 as shown in Figs. 8 and 10.

From the top of the chamber 92 extends an outlet pipe 99 to carry off the heat therein.

The valve 47 has a branch 100 through which the tank 10 is adapted to be filled with liquid, said pipe 48 at this time being cut off and the liquid passing through the pipe 46 and strainer 42 to the pump 30, from which it is forced through the strainer 43 and pipe 50 to the valve 53, and then through the pipe 54 into the bottom of the tank 10. The tank having been filled, the inlet 100 is closed and the valve 53 is turned so that the liquid may flow from said tank through the valve 47 into the pipe 46 to the pump from which it is forced through the pipe 50 to and through the valve 55 into the pipes 56—57 to the valve 59 which if open will permit the discharge of the liquid through the sprinkler pipes 65. These pipes 65 may be moved laterally of the frame 13 by the handle 71, said movement being about the axes of the depending pipes 62 and said pipes 65 having a movement also about the axes of the pipes 64 so that the pipes 65 are always perpendicular to the axis of the frame 13 into whatever position they may be moved.

When the sprinkler system is in use the valve 60$^x$ is closed but if it is desired to empty the tank this valve 60$^x$ is opened and the valves 59 closed. The liquid will then be charged through the pipe 60. The end of this pipe is threaded and a hose may be attached thereto so that if the tank is filled with water a stream may be forced therethrough for the purpose of putting out fires. While the pump 30 is in operation, if any of the cutoff valves are closed temporarily the liquid discharged from the pump 30 will pass through the bypass pipe 44 to the inlet side of the pump, the relief valve 45 permitting this operation when a predetermined pressure has been reached.

When heavy oils are used that require heat to put them in suitable condition for use, the heater 96 is lighted and as the heat therefrom passes through the pipes 94 into the chamber 92, the oil is circulated through the tank. This is accomplished by closing the valve 55, opening the valve 52, and causing the pump 30 to force the oil through the pipe 51 into the top of the tank, while the oil in the bottom thereof is permitted to pass through the pipes 54, 48 and 46 to the inlet side of the pump. A constant circulation of the oil is thus created, which is continued until the oil is of the proper consistency, and has a predetermined and uniform temperature throughout. This circulation may be created either while the vehicle is moving or at rest. This is of considerable importance for it is essential that means should be provided whereby oils of different kinds may be differently treated and that they be of uniform temperature and consistency.

The valve 52 is left partially open when the sprinkler system is in operation, and if an extra quantity of oil is desired at a given point, the operator may further close said valve and the additional pressure thus created will force a greater quantity of oil through the sprinkler system. Any degree of pressure up to the maximum of the relief valve 45 may be obtained by properly setting the opening of the valve 52.

The vehicle is adapted for several different uses for it may be utilized for applying crude oil to a road during the process of construction, or it may be used for applying lighter oils to the surface of the finished roads.

The oil may be withdrawn from the tank and said tank filled with water and the device used as a sprinkling vehicle. When the tank is filled with water the vehicle may be utilized for fire protection.

The discharge pipe 60 may also have secured thereto some form of flushing apparatus whereby the streets may be flushed.

On account of the several uses for which the vehicle may be uesd, it is particularly valuable for small towns that can ill afford to purchase a great variety of apparatus.

It is believed that the operation and many advantages of this invention will be fully understood from the foregoing description.

Having thus described my invention, I claim:

1. In a device of the class described, the combination of a tank; a pump; an inlet pipe leading to the inlet of said pump; a three-way cock in said pipe; a pipe leading from said cock to the bottom of said tank; a pipe from said pump to the top of said tank; a cutoff valve in said pipe; a connecting pipe beneath said valve communicating with the pipe leading to the bottom of said tank; a valve therein; and an outlet pipe communicating with said valve.

2. In a device of the class described, the combination of a tank; an outlet therefrom; a pump therefor; a plurality of alined sprinkler pipes communicating with said outlet pipe and provided with upwardly extending ribs; a drip pan adapted to be positioned beneath said sprinklers to cut off the spray therefrom; pivoted members supporting said drip-pan; a yoke connecting said pivoted members and normally abutting said rib; and means for moving said drip pan from beneath said sprinkler pipes.

3. In a device of the class described, the combination of a tank; an outlet therefor; a transverse pipe communicating with said outlet pipe; parallel longitudinal pipes extending from the ends of said transverse pipe; a bypass pipe connecting the ends of said longitudinal pipes; a relief valve therein; a cross pipe connecting said longitudinal pipes; a pump therein; a pipe extending longitudinally of the device from said transverse pipe; a three-way cock connecting said longitudinally extending pipe to said transverse pipe; a U-shaped pipe at the outer end of said longitudinally extending pipe; a sprinkler system pivotally connected to each end of said U-shaped pipe; means for moving said sprinkler system about said pivots; and means for retaining said sprinkler system in alinement during said pivotal movement.

Signed by me at Boston, Mass., this 2nd day of April, 1914.

JUSTUS R. KINNEY.

Witnesses:
 ERNEST B. NEAL,
 HENRY K. POTTER.